Dec. 13, 1966  W. J. DEANE  3,291,456
SELF-AGITATING, STABILIZED FLOW MIXING VESSEL
Filed July 1, 1964  2 Sheets-Sheet 1

INVENTOR.
WILLIAM J. DEANE
BY
*Robert L. Olson*
ATTORNEY

INVENTOR.
WILLIAM J. DEANE
BY
*Robert L. Olson*
ATTORNEY 3,291,456
SELF-AGITATING, STABILIZED FLOW
MIXING VESSEL
William J. Deane, Hartford, Conn., assignor to Combustion Engineering, Inc., Windsor, Conn., a corporation of Delaware
Filed July 1, 1964, Ser. No. 379,697
3 Claims. (Cl. 259—4)

This invention relates to a mixing vessel, and in particular to such a vessel wherein two high pressure fluids having substantially different temperatures can be mixed.

In certain fields, for example the boiler field, it is very often desirable to combine two fluids of different temperatures. When these fluids are at extremely high pressures, and also high temperatures, the problem of stresses created by temperature differences is encountered; and also the problem exists of vibrations or oscillations within the vessel, which can be created when operating under high pressure.

It is an object of this invention to provide a mixing vessel wherein two high pressure fluids having substantially different temperatures may be combined and intimately mixed without creating excessive temperature stresses therein, or undue vibrations thereof.

Other and further objects will become more apparent from the following description when taken in conjunction with the accompanying drawings wherein.

Figure 1:
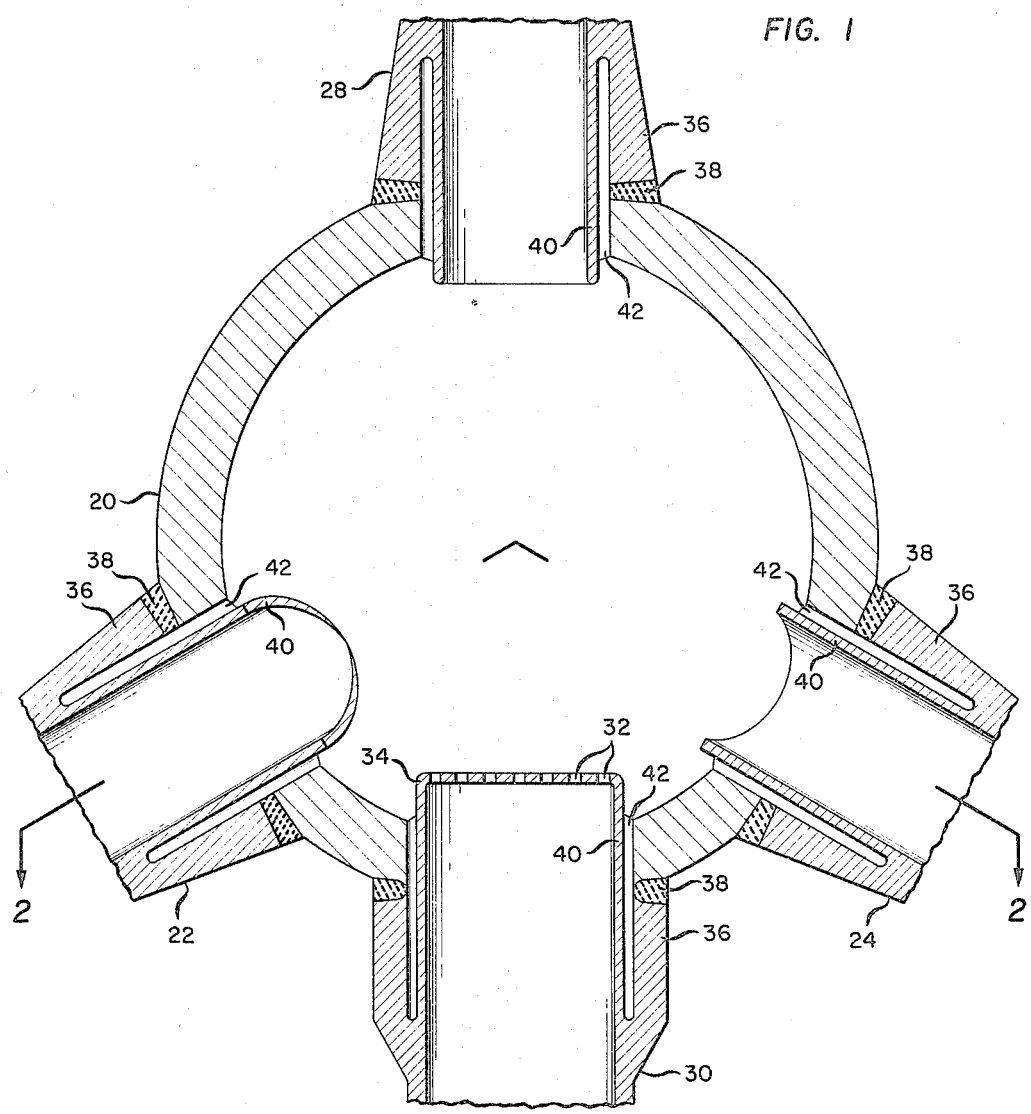
FIG. 1 is a sectional elevation of the mixing vessel of this invention taken on line 1—1 of FIG. 2.
Figure 2:
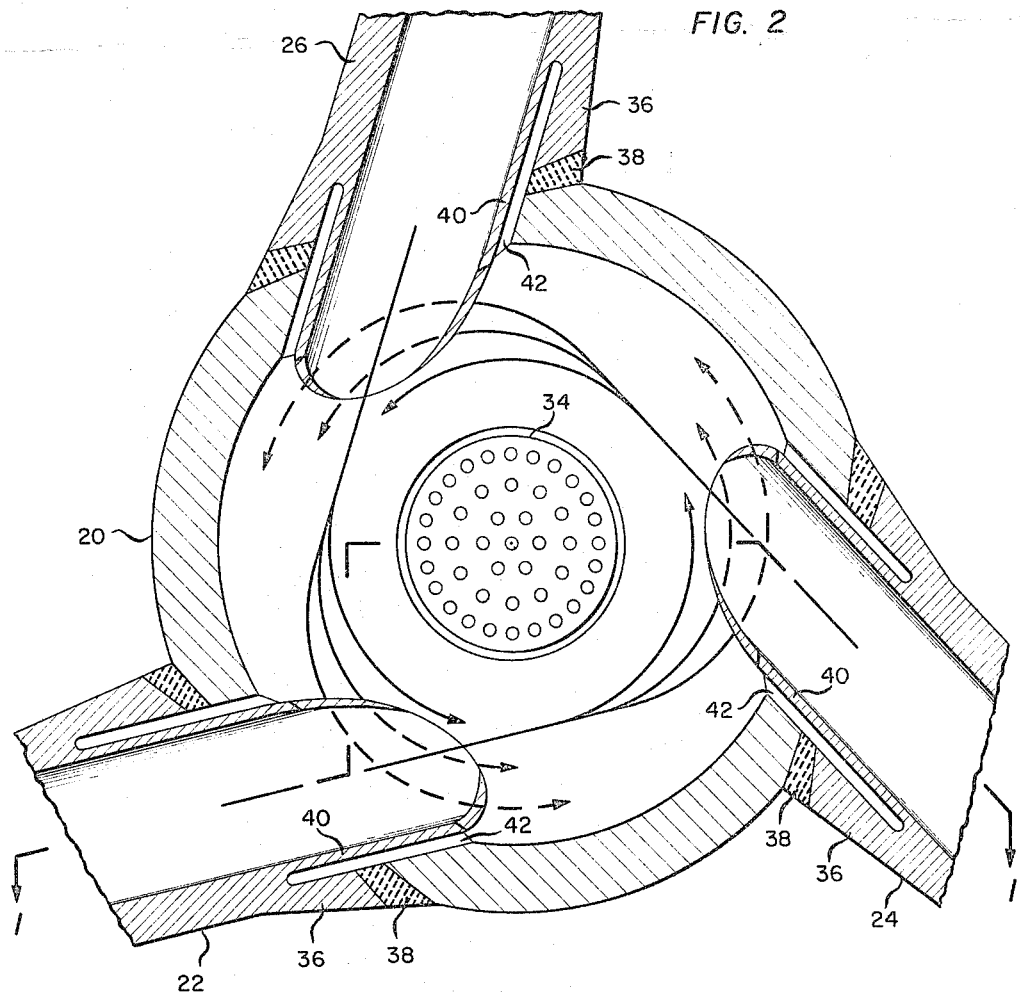
FIG. 2 is a plan view in section taken on line 2—2 of FIG. 1.

Looking now to FIG. 1, numeral 20 designates a heavy-walled, spherical mixing vessel. Connected to the sphere are three inlet lines 22, 24 and 26. As shown in FIG. 2, these three inlet lines are equidistantly spaced. A first fluid of a first given temperature is introduced into the sphere through these three inlet lines.

As seen in FIG. 1, a fourth inlet line 28 is connected to the top dead center of the sphere. A second fluid at a second temperature is introduced through this line.

Diametrically opposed from inlet line 28 is an outlet line 30. The mixed fluid is discharged from the vessel through this line. A strainer 34, having openings 32 therein, is positioned over the opening leading to the outlet line 30. This strainer will prevent any foreign objects, which may be carried into the mixing vessel, from passing down into outlet line 30, which foreign objects could damage pumps or other equipment positioned within this line. The cross-sectional flow area of the openings 32 within strainer 34 is at least as large as the cross-sectional flow area of outlet line 30, so that no pressure loss of the fluid is encountered in flowing therethrough.

Each of the inlet lines and the outlet line contains a heavy outer wall portion 36 which is secured to the outer surface of the vessel housing by means of welds 38. Each line further contains an inner, thin-walled sleeve portion 40, there thus being formed an annular space 42 between the sleeve 40 and the wall of the mixing vessel in which relatively stagnant fluid stands. This construction forms a thermal barrier which protects both the mixing vessel and the fluid lines connected thereto from undue stresses caused by temperature differential.

As seen in FIG. 1, the fluid introduced through inlet lines 22, 24 and 26 is discharged in an upward direction, such streams thus coming into contact with the mixing vessel wall in the upper portion of the vessel. As shown in FIG. 2, these fluid streams are not only discharged in an upward direction, but are also directed towards the periphery of an imaginary cylinder which has the same axis as the vertical axis of the mixing vessel. As shown by the dotted lines in FIG. 2, such tangential introduction sets up a definite, continuous, rotational flow pattern within the mixing vessel. As seen in FIG. 2, a counterclockwise flow of these fluids is established.

Each of the tangential streams of fluid being discharged from lines 22, 24 and 26 intersects a portion of the stream of fluid discharged downwardly from line 28. Thus each of these streams causes a portion of the hot stream of fluid from line 28 to be carried along with it. In this manner, the two fluids are intimately mixed before reaching the outlet line 30. It can also be seen that the entire interior wall surface of the mixing vessel is swept by a fluid having a uniform temperature.

This mixing vessel is capable of handling fluids at supercritical pressures (pressures above 3200 p.s.i.). At such pressures, unless definite, stable flow patterns are established within the vessel, substantial damage could be caused by vibrations and oscillations, which would be present if there were fluctuating, unstable flow patterns within the vessel. This is especially true when operating at high temperatures, for example above 700° F.

It can be seen that as the diameter of the imaginary cylinder (towards which the streams are tangentially directed) is increased, the flow pattern established will become more and more stable. However, the mixing action of the two fluids becomes less as this diameter is increased. Thus it is desirable to make the diameter of the imaginary cylinder such that a definite flow pattern is established, while the stream of fluid discharged from line 28 is intersected sufficiently to cause good mixing action between the two fluids. This is accomplished by making the diameter of the imaginary cylinder approximately the same as the diameter of inlet line 28.

What I claim is:

1. Apparatus for mixing high pressure fluids that are at substantially different temperatures, comprising a spherical housing, a first input line connected to the top of the spherical housing for introducing a stream of first fluid into the spherical housing interior in a direction coinciding with the vertical axis thereof, a plurality of second input lines connected to the spherical housing for introducing streams of a second fluid, which is at a substantially different temperature than the first fluid, into the spherical housing, said second input lines all being connected to the spherical housing in the same horizontal plane, and being equidistantly spaced, all of the second input lines being positioned such that all of the streams of second fluid are directed tangentially of an imaginary cylinder, the axis of which coincides with the vertical axis of the spherical housing, and an output line connected to the bottom of the spherical housing being diametrically opposed to the first input line, through which the mixed fluid is discharged.

2. The apparatus set forth in claim 1, wherein said second input lines are positioned such that the entering streams of second fluid form an acute angle with a horizontal plane passing through the center of the spherical housing.

3. The apparatus set forth in claim 2, wherein said second input lines are connected to the spherical housing below a horizontal plane passing through the center of the spherical housing.

References Cited by the Examiner
UNITED STATES PATENTS
1,080,957  12/1913  Davis _____ 137—603

FOREIGN PATENTS
972,123  5/1959  Germany.

WALTER A. SCHEEL, Primary Examiner.
J. M. BELL, Assistant Examiner.